UNITED STATES PATENT OFFICE.

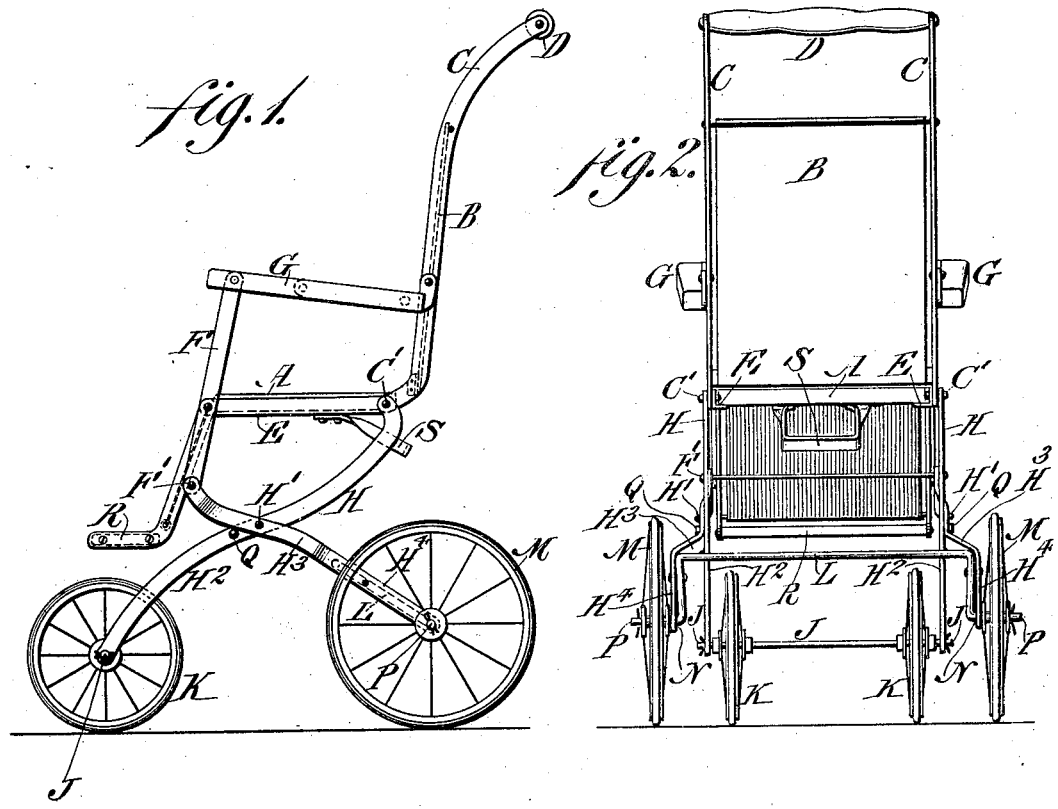
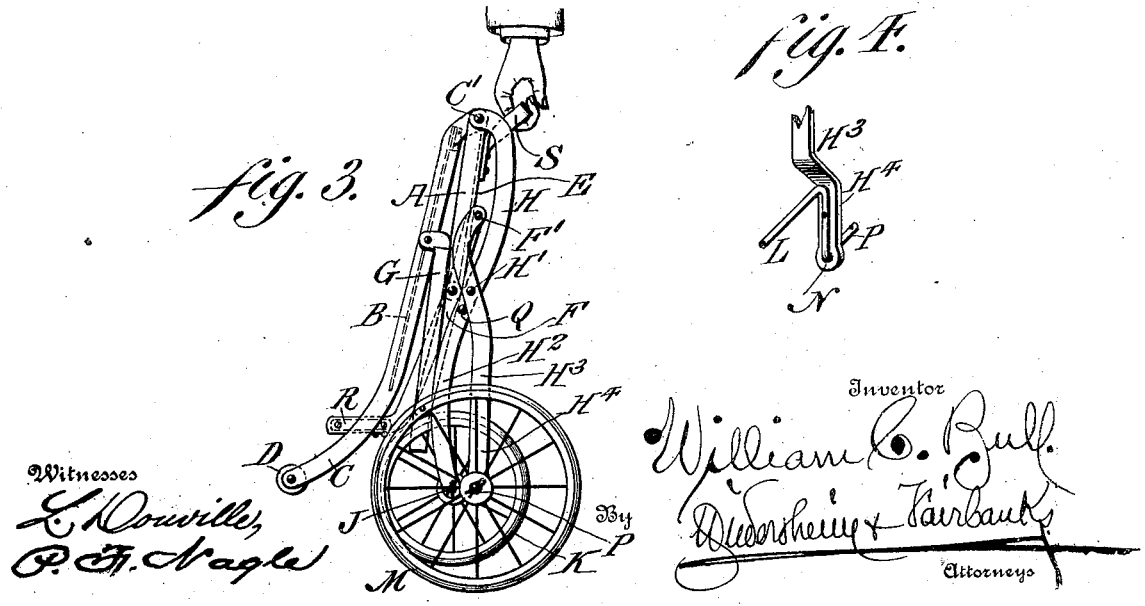

WILLIAM C. BULL, OF CAMDEN, NEW JERSEY, ASSIGNOR OF ONE-SIXTH TO WILLIAM J. ROBERTSON, JR.

FOLDING GO-CART.

No. 861,203.        Specification of Letters Patent.        Patented July 23, 1907.

Application filed April 8, 1907. Serial No. 367,084.

*To all whom it may concern:*

Be it known that I, WILLIAM C. BULL, a citizen of the United States, residing in the city and county of Camden, State of New Jersey, have invented a new and useful Folding Go-Cart, of which the following is a specification.

My invention consists of a go-cart or child's carriage, which is automatically foldable, and composed of few simple, light and inexpensive members, which are assembled so as to be capable of folding in compact form, as will be hereinafter set forth.

Figure 1 represents a side elevation of a go-cart embodying my invention. Fig. 2 represents a rear elevation thereof. Fig. 3 represents a side elevation of the go-cart in folded condition. Fig. 4 represents a perspective view of a detached portion.

Similar letters of reference indicate corresponding parts in the figures.

Referring to the drawings: A designates the seat of a go-cart or similar carriage, and B designates the back thereof. C designates arms, to which the sides of said back are secured, said arms being extended upwardly, and having connected with them the handle D for evident purposes.

The sides of the seat A are rested upon and secured to the angle irons or bars E, to the rear of which the lower portions of the arms C are pivotally attached. To the front ends of said bars E, are pivotally attached the arms F, the upper ends of which are pivotally attached to arm rests G, which latter are pivotally connected with arms C of the back B.

H designates crossed legs, which are respectively connected as at C' at rear with the lower ends of the arms C, and the rear ends of the bars E, and as at F' in front with the lower ends of the arms F, said legs H being connected, intermediate of their ends, by the pivot H', which also permit the same to be folded.

On one pair of legs H², are the bearings for the axle J of the front wheels K, and on the other pair of legs H³, are the bearings for the axle L of the rear wheels M, said axle L being of the form of a crank, it being noticed that lower ends of the pair of legs H³ continue, as at H⁴, along the side limbs of the crank axle L, and is riveted or otherwise secured thereto, the lower ends of said legs also having eyes N, which are fitted on the members P of the axle, on which the wheels M have their bearings.

Connected with the legs H², in front of the pivot H', is the stud or shoulder Q, which projects laterally outwardly from said leg and forms a stop against which the lower edges of the upper portions of the legs H³ may abut in the operative condition of the cart, thus sustaining the legs, and limiting the descent of the same, and retaining the wheels K, M, in their spaced-apart positions.

R designates a foot rest, which is pivoted to and depends from the front of the seat A, as usual in such cases.

Connected with the rear end of the seat A, is the handle S, which may be grasped in order to fold the cart, and carry the same in folded condition.

When the cart is in operative condition, the various members are in the positions shown in Figs. 1 and 2, and the cart may be employed as usual.

When it is desired to fold the cart, the handle S is grasped, and the cart is raised by the same. The seat then folds down, the back folds downwardly over the seat, the arm rests fold with said back, the arms C folding over the foot rest, the cross legs close, after the manner of shears, and the front and rear wheels are brought closely together, one pair folding within the other pair the several members thus being compactly folded, in which condition, the cart may be conveniently carried, transported, packed, etc.

In order to unfold the cart, the handle is grasped, when the back is raised, the cross legs unfold, the seat and arm rests resume their normal positions, and the wheels are restored to the front and rear positions, further downward movement of the cross legs being prevented by the stops Q, and the weight of the child occupying the cart serving to keep the wheels K, M properly apart, and preventing folding of the legs, and consequently of said wheels.

While I have specified certain means for carrying out my improvements, I do not wish to be limited exactly to the same, but desire to make such changes as may come within the scope of the novelty involved. Special attention, however, being directed to the fact that when the handle is grasped and the cart lifted thereby, the folding parts immediately move automatically into folded position, the result being shown in Fig. 3, it being also evident that the handle S projects from the seat in such manner that while it is convenient of access for lifting the cart to accomplish the folding of the parts of the same, it projects sufficiently from the seat so as to relieve the hand from being pinched or squeezed by the adjacent parts of the cart in folding.

Having thus described my invention, what I claim as new and desire to secure by Letters Patent, is:—

1. A go-cart composed of a folding seat, a folding back, folding legs, and wheels mounted on said legs, said back being adapted to fold in front of the seat, and said legs to fold on the rear thereof, one pair of wheels being adapted to fold within the other pair of wheels.

2. A go-cart composed of a folding seat, a folding back, folding legs, wheels on said legs, and a handle on said seat, whereby when the cart is raised by said handle, the parts fold automatically on each other.

3. In a go-cart, a folding seat, a folding back, cross legs, which are pivotally connected with each other, and wheels on said legs, said seat, said back and one pair of said legs having a common pivotal connection.

4. In a go-cart, a folding seat, folding arm-rests, folding cross legs, and folding side arms, the latter being pivotally connected with said rests, seat and the front members of said legs.

5. In a go-cart, a seat, a leg, a crank axle, a wheel mounted thereon, and a leg attached to said seat and adapted to be connected with the side limb of said axle.

6. In a go-cart, a crank axle, a wheel on said axle, a leg adapted to be secured to the side limb of said axle, and an eye member on said leg adapted to embrace the portion of said axle on which said wheel is mounted.

WILLIAM C. BULL.

Witnesses:
JOHN A. WIEDERSHEIM,
HARRY C. DALTON.